United States Patent [19]

Benezra

[11] 3,890,329

[45] June 17, 1975

[54] HYDROGENATION PROCESS WITH UNSUPPORTED GROUP VIII METAL HYDROXIDE CATALYSTS

[75] Inventor: Leo L. Benezra, Mentor, Ohio

[73] Assignee: Diamond Shamrock Corporation, Cleveland, Ohio

[22] Filed: Feb. 15, 1973

[21] Appl. No.: 332,663

[52] U.S. Cl. ......... 260/293.52; 260/326.8; 260/667
[51] Int. Cl. ............................................. C07d 29/06
[58] Field of Search ............ 260/293.52, 326.8, 667

[56] References Cited
UNITED STATES PATENTS
2,675,390 4/1954 Rosenblatt .................. 260/326.8
3,177,258 4/1965 Rylander ..................... 260/326.8
3,767,720 10/1973 Drinkard ..................... 260/667

OTHER PUBLICATIONS
Nishimura et al., Bull. Chem. Soc. Japan 39(2), 329–333 (1966).

Primary Examiner—G. Thomas Todd
Attorney, Agent, or Firm—Helen P. Brush; Roy Davis

[57] ABSTRACT

The hydroxides of Group VIII metals as cobalt, ruthenium, palladium, rhodium, and nickel are employed in an undried, unsupported state as catalysts for the hydrogenation of unsaturated carbocyclic and heterocyclic compounds, particularly compounds such as benzene, pyridine, and substituted pyrroles and pyrrolines, to their corresponding more saturated derivatives.

11 Claims, No Drawings

HYDROGENATION PROCESS WITH UNSUPPORTED GROUP VIII METAL HYDROXIDE CATALYSTS

BACKGROUND OF THE INVENTION

1. Field of the Invention

This invention relates to an improved process for preparing saturated or partially saturated cyclic compounds from related unsaturated intermediates, and more particularly, provides an improved low pressure hydrogenation process which utilizes as the catalyst, the product obtained by reacting a water-soluble salt of a Group VIII metal such as cobalt, ruthenium, palladium, rhodium, or nickle with a compound supplying hydroxyl ions in aqueous solution, which product is utilized in an undried, unsupported state.

2. Description of the Prior Art

As reported by Morris Freifelder in "Practical Catalytic Hydrogenation", John Wiley and Sons, New York (1971), supported platinum oxide or reduced rhodium have long been the preferred catalysts for saturation of aromatic compounds, such as benzene, and of heterocyclic compounds such as pyridine and particularly pyrroles, pyrrolines, and the like, at low hydrogen pressure and in acid media. For example, Evans in JACS, 73, 5231 (1951) reports that cis-2,5-dimethylpyrrolidine can be prepared by the catalytic reduction of 2,5-dimethylpyrrole at a hydrogenation pressure of about 45 psig using Adams (platinic oxide) catalyst in glacial acetic acid. Overberger et al in JACS, 77, 4102 (1955) report that cis-2,5-dimethylpyrrolidine can be prepared by the catalytic reduction of 2,5-dimethylpyrrole at a hydrogen pressure of 40 psig, using a 5 percent rhodium on alumina catalyst in glacial acetic acid. Also, U.S. Pat. No. 2,675,390 (Rosenblatt), issued Apr. 13, 1954, describes the hydrogenation of pyrrole using a 5 percent rhodium on alumina catalyst in solvents such as glacial acetic acid and water.

More recently, Rylander et al in U.S. Pat. No. 3,177,258, issued Apr. 6, 1965, suggest hydrogenation of pyrroles using a supported catalyst containing ruthenium in combination with another platinum group metal. Ruthenium as the dioxide or the metal on a support such as carbon or alumina, likewise has been applied with considerable success as a catalyst for the reduction of a number of ring systems at moderately high pressures and temperatures, e.g., in the saturation of aromatic homocyclic compounds such as benzene or of heterocyclic compounds such as pyridine.

Still more recently, the use of either a ruthenium or rhodium hydroxide-carbon black mixture as a catalyst for reducing organic compounds such as aniline, toluene, benzoic acid, ortho-xylene, and the like, has been reported by Nishimura et al in Bull. Chem. Soc. Japan, 39(2), 329–33 (1966).

I have now found that unsaturated carbocyclic hydrocarbons and heterocyclic hydrocarbons may be easily converted to their more saturated derivatives at moderate temperature and pressure, employing as the hydrogenation catalyst an unsupported derivative of either cobalt, ruthenium, palladium, rhodium, or nickel.

SUMMARY OF THE INVENTION

Accordingly, this invention provides an improved process for the catalytic hydrogenation or aromatic hydrocarbons, such as benzene, and heterocyclic hydrocarbons such as pyridine and particularly 2,5-dialkylpyrroles and 2,5-dialkyl-1-pyrrolines to their corresponding saturated derivatives wherein an undried, unsupported compound of a Group VIII metal is employed as the catalyst, said compound being obtained by reacting a water-soluble salt, e.g., the chloride of the Group VIII metal, with a compound which yields hydroxyl ions in aqueous solution, e.g., a metallic hydroxide. Optionally, the hydrogenation reaction may be conducted with the inclusion of a minor quantity of a finely-divided alumina as a filter aid for separating the catalyst upon completion of the reaction. Hydrogen pressures ranging from about 100 to about 1500 psig and moderate reaction temperatures of 70°–200° C generally may be utilized. If desired, an inert liquid reaction medium such as water may be employed and also other adjuvants such as stabilizers, antioxidants, and the like. High conversions of the desired saturated products are obtained from the process, e.g., 2,5-dialkylpyrrolidines having cis-isomer contents from about 90 percent to about 98 percent are typical.

DESCRIPTION OF THE PREFERRED EMBODIMENTS

Any unsaturated carbocyclic or heterocyclic compound which can be converted to its related saturated derivative in practical yield under moderate hydrogen pressure generally may be reduced effectively in the process of this invention using the described Group VIII metal catalysts. In particular, benzene, pyridine, and still more particularly, dialkylpyrroles and dialkyl-$\Delta 1$-pyrrolines are most efficiently hydrogenated herein to the desired saturated cyclic compounds.

As described previously and more in detail hereinafter, the metallic compound employed as the hydrogenation catalyst in the process of this invention is obtained by reacting a water-soluble salt, e.g., the chloride of a Group VIII metal such as cobalt, ruthenium, palladium, rhodium, or nickel with a compound which supplies hydroxyl ions in aqueous solution, said product then being utilized in the undried state.

Compounds which yield hydroxyl ions in aqueous solution include, among others, the hydroxides of metals such as sodium, potassium, lithium, cesium, calcium, barium, and strontium and also ammonium hydroxide. Because of its ready availability and low cost, sodium hydroxide is the hydroxyl ion-supplying compound presently preferred, and specific reference may be made hereinafter to this compound. Such specific reference, however, is not intended to limit the present invention in any way.

The hydrogenation catalyst employed in the present invention is believed to contain no metal in the form of oxides, being prepared predominantly as the hydroxide of the metal. However, it is possible that compounds other than the hydroxides may be present in minor quantities.

As basis for the belief that the hydrogenation catalyst of this invention is predominantly a metallic hydroxide, the product obtained from the reaction of ruthenium chloride, $RuCl_3 \cdot xH_2O$, with sodium hydroxide, for example, has been found to be completely amorphous by X-ray diffraction, no crystallinity pattern being evident. Also, this product is completely solubilized readily in warm hydrochloric acid (HCl), which further indicates that it is more likely the hydroxide of the metal than the oxide which is insoluble in HCl. For all of these reasons, the metallic reaction products employed as hydrogenation catalysts in the process of this invention are specifically designated herein as "hydroxides" and "metallic hydroxides".

In general, the hydroxides of either cobalt, ruthenium, palladium, rhodium, or nickel may be employed as the hydrogenation catalyst in the process of this invention. At present, the preferred hydroxides are those of ruthenium and cobalt because of their comparative efficiency in effecting the hydrogenation reaction and production of the desired saturated compounds in optimum yields, and, for this reason, specific references may be made hereinafter to ruthenium hydroxide and cobalt hydroxide.

The metallic hydroxides used in the process of this invention are themselves prepared simply and efficiently by dissolving a suitable salt, e.g., a chloride of the metal, in a water-hydrochloric acid medium, then slowly adding sufficient 15–20 percent aqueous caustic soda to the metallic salt solution with agitation to make the reaction mixture alkaline. The reaction mixture is then adjusted to a pH of 6–9 by the addition of hydrochloric acid. The reaction mass is filtered and the metallic hydroxide solids recovered are washed with water until the washings show only a slight test for chloride ion when tested with standard silver nitrate solution. The preparation of the hydroxides does not constitute a part of the present invention.

The metallic hydroxides so prepared may then be employed in the hydrogenation reaction as a wet cake or a paste without drying. The amount of metallic hydroxide employed in the hydrogenation process, based on the weight of the unsaturated compound to be reduced, is sufficient generally to supply from about 0.02 percent to about 1 percent metal.

As described previously herein, alumina powder may also be incorporated in the hydrogenation reaction mixture of this invention along with the hydrogenation catalyst. Alternatively, it may be incorporated into the reaction mixture after hydrogenation is completed. The alumina serves primarily as a filtration aid for recovering the catalyst efficiently from the hydrogenation mixture. Any finely-divided alumina may suitably be employed for this purpose as, e.g., the CATAPAL aluminas manufactured by Continental Oil Company.

It should be noted that if alumina is incorporated in the initial reaction mixture, no impregnation thereof with the metallic hydroxide is believed to occur nor is there any other form of intimate blending of the hydroxide and the alumina components. Within the hydrogenation reaction system, the metallic hydroxide and the alumina exist as separate entities, merely in admixture within the system. When employed, the alumina power is used generally in amounts ranging from about 0.02 percent to about 0.50 percent, based on the weight of the compound to be reduced. The amount of alumina employed does not appear to affect the efficiency of the reduction reaction in any way.

In carrying out the hydrogenation reaction, the metallic hydroxide catalyst and the compound to be reduced, optionally in the presence of an alumina powder, and reacted at a temperature from about 70° to 200°C and at hydrogen pressures ranging generally from about 100 to 1500 psig. The reaction time typically may range from 0.5 to about 20 hours. Inert, secondary reaction media which are neither reactive with the starting materials nor with the desired product may optionally be used. However, at present, it is preferred to carry out the reaction without the addition of any secondary reaction media, since optimum yields of the desired saturated product generally may be obtained in their absence.

After hydrogenation is complete, the catalyst is separated from the hydrogenation mixture and the mixture analyzed by vapor phase chromatography using an Amine 220 Column (Supelco, Inc., Bellefonte, Pennsylvania). When 2,5-dimethylpyrrole is hydrogenated, the resulting pyrrolidine product generally contains at least about 80 percent of the cis-isomer, by weight.

The process of this invention provides an easily operated commercially feasible method for obtaining optimum yields of, e.g., cyclohexane, piperidine, or stereospecific cis-isomers of 2,5-dialkylpyrrolidine from related unsaturated precursors. In this process, a simply prepared Group VIII metallic hydroxide in the form of a wet cake or paste is employed as the hydrogenation catalyst rather than supported and/or reduced Group VIII metal catalysts heretofore employed in the art. The process of this invention may be carried out without employing the acetic acid medium used heretofore with its accompanying handling and recovery problems.

For a fuller understanding of the nature and objects of this invention, reference may be made to the following examples.

EXAMPLE 1

A. Preparation of a Ruthenium Hydroxide Hydrogenation Catalyst

In a reaction flask equipped with a high-speed, blade-type stirrer, 5.0 g of $RuCl_3 \cdot xH_2O$ (37.48 percent, by weight, ruthenium metal) is stirred with 10 g of concentrated hydrochloric acid and 40 ml of water until dissolution is complete and an intensely colored, practically opaque, reddish solution is obtained. To this solution, about 15 ml of 15 percent aqueous caustic soda is added, dropwise, over a 30 minute period, after which the reaction mixture has a pH of about 8.5. It is then back titrated with about 3 drops of concentrated HCl to a pH of about 6.5. The reaction mixture is filtered and water washed until the washings contain less than 100 ppm chloride ion when tested with standard silver nitrate solution. The weight of the wet solids cake recovered is $15.0 g \pm 0.1 g$.

Based on the weight of ruthenium metal (1.87 g) in the quantity of $RuCl_3 \cdot xH_2O$ reacted, 2.82 g of $Ru(OH)_3$ is produced. The concentration of ruthenium metal in the wet cake (15.0 g obtained) is 0.188 g/g of wet cake.

The $Ru(OH)_3$, dried in a vacuum oven at 100° C for 24 hours, is examined by X-ray diffraction and is found to be completely amorphous with no crystallinity pattern.

B. Hydrogenation of 2,5-Dimethylpyrrole

A 250-ml stainless steel autoclave is charged with 44 g of freshly distilled 2,5-dimethylpyrrole, 0.43 g of the above-described wet cake (supplies 0.18 percent ruthenium metal, by weight of the pyrrole reactant) and 0.11 g of alumina (0.25 percent, based on weight of the dimethylpyrrole). The autoclave is sealed and purged repeatedly with nitrogen first and then with hydrogen and is finally pressured with hydrogen to approximately 400 psig.

The reaction mixture is then heated at a rate of 2°–4° C/minute to a final temperature of 140°–150° C. During heating, the pressure increases briefly to a peak of 440 psig at 75° C, and then rapidly decreases to 400 psig or below as $H_2$ absorption proceeds chemically. The reaction is complete when the pressure drop in the hydrogen reservoir indicates that the calculated amount of hydrogen has been consumed. The reaction is completed in about 2¼ hours.

The reactor is cooled and vented. The reaction mixture is removed and filtered to separate the catalyst and the alumina filter aid. The filtrate is analyzed by vapor phase chromatography. The chromatographic column contains a 3/16 inch × 6 feet spiral tube packed with 5 percent of Supelco Amine 220 on Chromosorb "G" High Performance (80–100 mesh). It is operated at a temperature of 70°–90° C for the quantitative analysis of cis- and trans-2,5-dimethylpyrrolidine and at a temperature of 150°–160° C for quantitative analysis of 2,5-dimethylpyrrole. The cis-isomer elutes first and is followed shortly by the trans-isomer after which the column temperature is raised to 150°–160° C. If unreacted pyrrole is present, this compound, under these conditions, will elute about 5 minutes after the pyrrolidine isomers and negligible traces of other components. From the amount of pyrrole eluted, the percent conversion is determined.

Using this procedure, the product of this example is recovered in 100 percent yield, no pyrrole being recovered. Greater than 91 percent of the product, by weight, is the cis-isomer.

The hydrogenation of 2,5-dimethylpyrrole is repeated, employing a quantity of $Ru(OH)_3$ wet cake which supplies 0.11 percent ruthenium by weight of the pyrrole reactant. The reaction is conducted at 135°–150° C at 400 psig for 5½ hours. Alumina (0.5 g) is added after the reaction is completed as a filter aid for removing the catalyst. The product filtrate is analyzed by vapor phase chromatography. The desired 2,5-dimethylpyrrolidine is recovered in 99 percent yield, 89 wt percent of which is the cis-isomer.

EXAMPLE 2

In this experiment, 2,5-dimethyl-Δ1-pyrroline is hydrogenated using the equipment and general procedure as outlined in Example 1 (Part B) above. The pyrroline employed contains, by weight, 0.9 percent cis-dimethylpyrrolidine, 35.3 percent trans-dimethylpyrrolidine, and 63.8 percent dimethyl-Δ1-pyrroline, as determined by vapor phase chromatography. Forty-four g (44) of the pyrroline and 0.43 g $Ru(OH)_3$ paste are employed (the percentage of ruthenium metal employed, based on the weight of the unsaturated pyrroline, is 0.18 percent).

The hydrogenation is conducted for 30 minutes at a hydrogen pressure of 400 psi. The reaction mixture is then cooled and filtered. Analysis of the product filtrate indicates that 96.5 percent of the dimethyl-Δ1-pyrroline fraction of the starting reactant has been converted by hydrogenation to cis-2,5-dimethylpyrrolidine.

Freshly distilled 2,5-dimethyl-Δ1-pyrroline is hydrogenated for 30 minutes at 130°–140° C and 400 psig, employing a quantity of the $Ru(OH)_3$ wet cake which supplies 0.11 percent ruthenium metal based on the weight of the pyrroline reactant. The alumina filter aid is incorporated in the reaction mixture after completion of the reaction. The filtrate recovered contains 100 percent of the theoretical yield of the 2,5-dimethylpyrrolidine product, 87 wt percent of which is the cis-isomer.

EXAMPLE 3

Following the same general procedure as outlined in the previous examples, pyridine (44 g) is hydrogenated employing 0.4 g of a $Ru(OH)_3$ wet cake which supplies 0.114 percent ruthenium metal, based on the weight of the pyridine. Alumina (0.25 percent, based on the weight of the pyridine) is incorporated in the reaction mixture. The reaction is carried out at 148° C under a constant hydrogen pressure of 400 psig, being completed in 2½ hours.

The saturated product, piperidine, is recovered in 97 percent yield, determined by vapor phase chromatography.

EXAMPLE 4

2,5-Dimethyl-Δ1-pyrroline (44 g) is hydrogenated as set forth in the previous examples, employing cobaltous hydroxide, $Co(OH)_2$. This compound is prepared by first dissolving 4.7 g $Co(NO_3)_2 \cdot 6H_2O$ in 30 ml of $H_2O$, then adding, dropwise and with agitation, sufficient 20 percent aqueous caustic to make the reaction mixture distinctly alkaline. The reaction mixture is then filtered and the solids are washed thoroughly. By analysis, 1 g of the wet solids cake is equivalent to 0.2 g cobalt metal.

For the hydrogenation reaction, 1.2 g of the wet cake is employed (supplying 0.55 percent cobalt metal, based on the weight of the pyrroline reactant) and 0.1 g alumina. The reaction is carried out at 190° C for 3 hours under a constant hydrogen pressure of 500 psig.

The reaction mixture is then filtered to separate the catalyst and filter aid. The filtrate is analyzed by vapor phase chromatography as previously described. The product of this example, 2,5-dimethylpyrrolidine, is recovered in 93 percent of theoretical yield, 94 wt percent of which is the cis-isomer.

EXAMPLE 5

Hydrogenation of 2,5-dimethyl-Δ1-pyrroline (44 g) is carried out employing the cobaltous hydroxide catalyst (0.6 percent metal) as set forth in Example 4. In this experiment, actual hydrogenation is effected at 190°–200° C and 400 psig for about 1 hour. The alumina filter aid is not incorporated into the reaction mixture until the reaction is completed. Using this procedure, 2,5-dimethylpyrroline is recovered in 98.5 percent of theoretical yield, 97.5 wt percent of which is the cis-isomer.

EXAMPLE 6

Benzene (40 g) is hydrogenated as set forth in Example 1 employing 0.4 g of a $Ru(OH)_3$ wet cake, supplying 0.125 percent ruthenium metal, by weight of the benzene reactant. The reaction is conducted at 125° C under a constant hydrogen pressure of 400 psig and is completed in 2½ hours.

The reactor contents are removed from the reactor and the product is separated from the catalyst by decantation. This product, recovered in 100 percent yield, is found by vapor phase chromatographic analysis to be cyclohexane.

EXAMPLE 7

In this experiment, freshly distilled 2,5-dimethyl-Δ1-pyrroline is hydrogenated at 178° C and 500 psig, employing a quantity of a $Co(OH)_2$ wet cake which supplies 0.28 percent cobalt metal, by weight of the pyrroline reactant. Alumina (0.25 percent by weight of the pyrroline) is also incorporated as a filter aid. The reaction is completed in approximately 45 minutes. The desired 2,5-dimethylpyrrolidine product is obtained in 99 percent of theoretical yield, 94 wt percent of which is the cis-isomer.

EXAMPLE 8

Palladium hydroxide, $Pd(OH)_2$, is prepared by first dissolving 0.50 g $PdCl_2$ (60 percent palladium metal) in 50 ml water containing 15 ml concentrated hydrochloric acid, then adding 20 percent aqueous caustic soda, dropwise, until the solution is neutralized and $Pd(OH)_2$ is precipitated as a brown solid. The precipitate is separated and washed thoroughly, and 1.124 g wet solids cake is obtained.

2,5-Dimethylpyrrole (44 g) is hydrogenated employing 0.37 g of the catalyst wet cake (contains approximately 0.1 g palladium, or 0.22 percent, based on the weight of the pyrrole reacted). The hydrogenation is conducted at 182° C and under a hydrogen pressure of 400 psig for 16 hours.

The reaction mixture is then filtered to separate the catalyst. The filtrate is analyzed by vapor phase chromatography and is found to contain 38 percent of the theoretical yield of the saturated product, 2,5-dimethylpyrrolidine, 79 wt percent of which is the cis-isomer. Sixty-one percent of the starting material, the dimethylpyrrole, remains unconverted.

Overall conversions to the desired dimethylpyrrolidine product may be increased by raising the reaction pressure and increasing the concentration of $Pd(OH)_2$ employed.

EXAMPLES 9 and 10

These examples illustrate the results obtained by hydrogenating 2,5-dimethylpyrrole, employing, as the catalyst, $Ru(OH)_3$ in admixture with carbon. The catalyst for each experiment was prepared by mixing 5 g $RuCl_3 \cdot xH_2O$ and 5 g Nuchar C 190 N carbon with 40 ml warm water containing 5 ml of 12 percent hydrochloric acid solution. To this mixture was then added 20 percent aqueous caustic soda until the mixture was neutralized, after which the mixture was filtered and the solids washed until free of chloride ion. The wet cake was used without drying.

Each experiment employed 44 g of freshly distilled 2,5-dimethylpyrrole, 0.1 g alumina, and catalyst quantities as shown below. Each was conducted initially at 150° C under 400 psig hydrogen pressure. Results were as follows:

| | Catalyst | | Reaction | Dimethyl-pyrrolidine | |
|---|---|---|---|---|---|
| Ex. | Ru (wt %) | Carbon (wt %) | Time (hr) | % Conv. | % Cis-isomer |
| 9 | 0.023 | 0.061 | 7[1] | 87 | 87 |
| 10 | 0.033 | 0.085 | 8[2] | 72 | 83 |

[1]Run slowed down in 4 hours, temperature raised to 160° C.
[2]Run slowed down, temperature raised to 160° C, but reaction ceased in 8 hours.

As these results indicate, use of a $Ru(OH)_3$-carbon catalyst provided reduced overall yields of dimethylpyrrolidine product and lower yields of this product in the form of the cis-isomer, by comparison to the results obtained using unsupported $Ru(OH)_3$ alone.

EXAMPLE 11

Nickelous hydroxide, $Ni(OH)_2$, is prepared as described previously for $Pd(OH)_2$, dissolving 2.9 g $Ni(NO_3)_2 \cdot 6H_2O$ in warm water and then adding 30 ml of an aqueous solution containing 1.2 g NaOH. The hydroxide precipitates and the mixture is quite alkaline. The nickelous hydroxide solids are separated and washed repeatedly. On a wet basis, these solids are determined to contain 0.12 g nickel metal/g wet cake.

Using 1 g of the $Ni(OH)_2$ wet cake, 44 g of 2,5-dimethyl-1-pyrroline is hydrogenated at a temperature of 180° C and 400 psig hydrogen pressure for a time period of 2 hours. The overall yield of 2,5-dimethylpyrrolidine in this time period is 30 percent of theoretical, 81 percent by weight of the product being in the form of the cis-isomer. Overall conversions and cis-isomer content of the pyrrolidine product may be significantly increased by increased catalyst concentration, longer reaction times and/or increased reaction pressure.

EXAMPLE 12

In this experiment, freshly distilled 2,5-dimethylpyrrole (44 g) is hydrogenated in water (10 ml) as an inert, secondary liquid reaction medium. As catalyst, 0.155 g of a $Ru(OH)_3$ wet cake is used, supplying 0.027 percent ruthenium metal based on the weight of the dimethylpyrrole reactant. Also included is 0.25 g alumina as a filter aid.

After sealing and purging the autoclave as previously described, the autoclave is pressured to 500 psig with hydrogen.

The reaction mixture is then slowly heated to 147° C and maintained at this temperature and at 500 psig hydrogen pressure for a total of 7 hours.

The reactor is cooled and vented. The reaction mixture is removed and filtered to separate the catalyst and filter aid. Analysis of the filtrate indicates that the product, 2,5-dimethylpyrrolidine, is obtained in 85 percent of theoretical yield, 95 wt percent of which is the cis-isomer.

EXAMPLE 13

Rhodium hydroxide, $Rh(OH)_3$, is prepared as described previously by dissolving 0.145 g $RhCl_3$ (39 percent rhodium) in water acidified with HCl, then adding aqueous caustic soda until a precipitate forms. The reaction mixture is adjusted to a pH of 6–7 by addition of HCl. The $Rh(OH)_3$ solids are separated and thoroughly washed.

Freshly distilled 2,5-dimethylpyrrole (44 g) is hydrogenated at 153° C and under 400 psig hydrogen pressure employing the $Rh(OH)_3$ wet cake which supplies 0.13 percent rhodium metal, by weight of the pyrrole reactant. Alumina (0.24 g) is also incorporated in the reaction mixture. After 2½ hours reaction time, the product is separated from the catalyst and alumina solids. Analysis of the product indicates the overall conversion to 2,5-dimethylpyrrolidine to be 20 percent of the theoretical yield, 90 wt percent of which is the cis-isomer. Increased yields of pyrrolidine product may be obtained by increasing the catalyst concentration and adjusting the reaction temperature and pressure to optimum conditions.

It is to be understood that although the invention has been described with specific reference to particular embodiments thereof, it is not to be so limited, since changes and alterations therein may be made which are within the full intended scope of this invention as defined by the appended claims.

I claim:

1. An improved process for converting an unsaturated carbocyclic or heterocyclic compound to its more saturated carbocyclic or heterocyclic derivative, which process comprises contacting said unsaturated carbocyclic or heterocyclic compound under a hydrogen pressure ranging from about 100 to 1500 psig, at a temperature of 70°–200° C. and in the absence of a water-soluble alkaline agent, with an unreduced Group VIII metal hydroxide which is unsupported and in an undried state as the sole hydrogenation catalyst, said unreduced Group VIII metal hydroxide having been obtained by first reacting a water-soluble salt of a Group VIII metal selected from the group consisting of cobalt, ruthenium, palladium, rhodium and nickel with a compound which supplies hydroxyl ions in aqueous solution, and then being isolated from the reaction mixture and washed prior to use.

2. The process of claim 1 wherein said hydroxyl ion-supplying compound is sodium hydroxide.

3. The process of claim 1 wherein said Group VIII metal hydroxide product is employed as catalyst in an amount which supplies from about 0.02 percent to about 3 percent metal, based on the weight of the unsaturated compound being reduced.

4. The process of claim 3 wherein the Group VIII metal hydroxide product is ruthenium hydroxide.

5. The process of claim 1 wherein the unsaturated heterocyclic compound hydrogenated is 2,5-dimethylpyrrole and the product obtained is predominantly cis-2,5-dimethylpyrrolidine.

6. The product of claim 1 wherein the unsaturated heterocyclic compound hydrogenated is pyridine and the saturated product is piperidine.

7. The process of claim 1 wherein the unsaturated carbocyclic compound hydrogenated is benzene.

8. The process of claim 1 wherein the unsaturated heterocyclic compound hydrogenated is 2,5-dimethyl-$\Delta$1-pyrroline and the saturated product obtained is predominantly cis-2,5-dimethylpyrrolidine.

9. The process of claim 8 wherein the hydrogenation catalyst is a cobalt hydroxide employed in an amount supplying from about 0.1 to about 3 percent cobalt metal, based on the weight of said dimethyl-$\Delta$1-pyrroline reactant.

10. The process of claim 1 which is conducted in the presence of a finely-divided alumina as a filter aid.

11. The process of claim 1 which is conducted in the presence of an inert liquid reaction medium.

* * * * *